Patented July 2, 1946

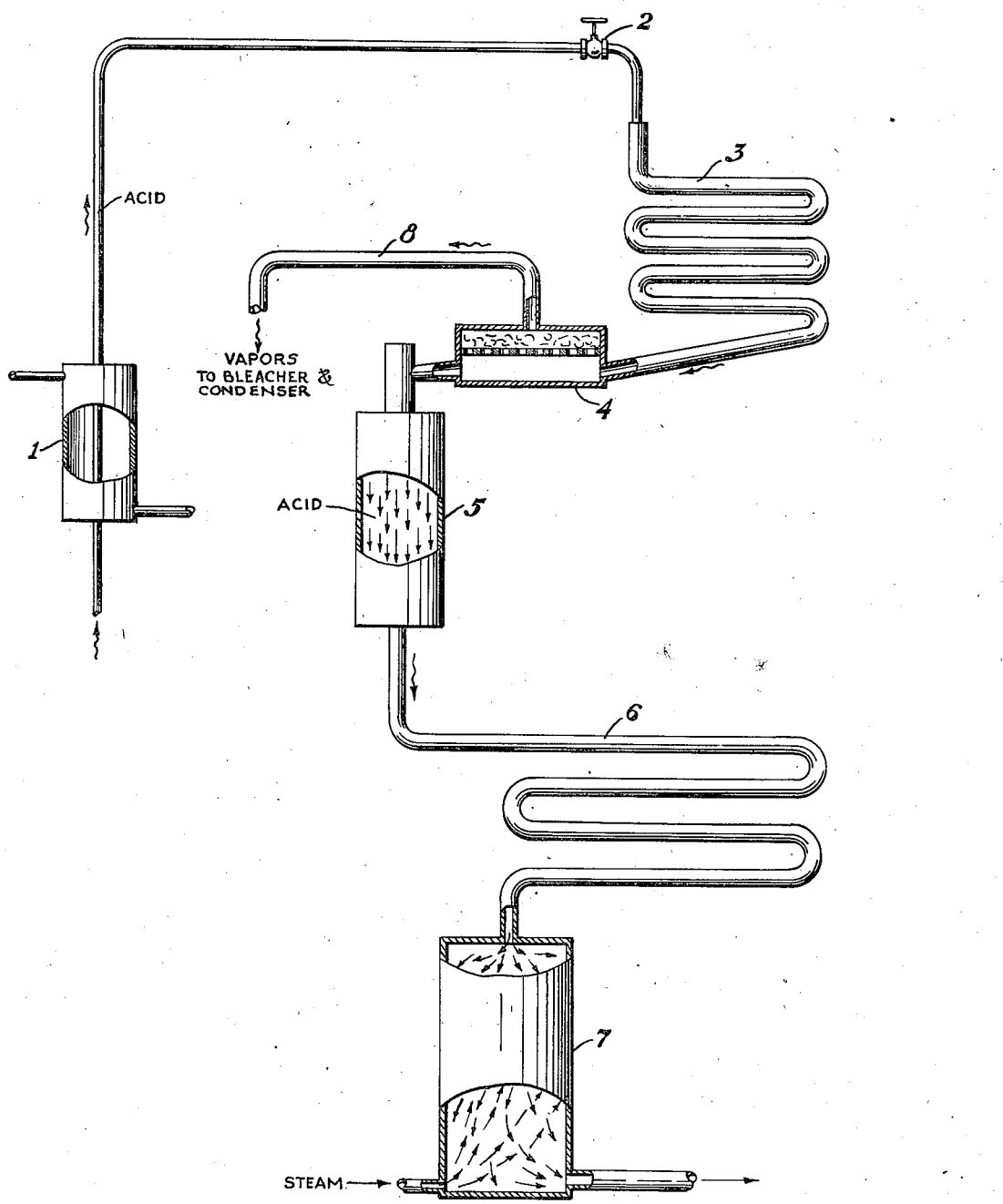

2,403,050

UNITED STATES PATENT OFFICE 2,403,050

CONCENTRATION OF NITRIC ACID

Francis Stapleton Chambers, Jr., Woodbury, N. J., and Robert Nifong Gartside, St. Louis, Mo., assignors to E. I. du Pont de Nemours & Company, Wilmington, Del., a corporation of Delaware Application August 22, 1942, Serial No. 455,776

1 Claim. (Cl. 202—40)

The present invention relates to a method of obtaining concentrated nitric acid from an aqueous solution thereof, and more particularly to such a method characterized by simplicity and increased efficiency.

Various methods have been proposed in recent years for concentrating relatively weak nitric acid solutions, all such methods depending on the use of dehydrating agents in mixture with these solutions and recovery of the nitric acid in concentrated form from the mixtures by use of heat. The methods employed have been effective in bringing about the desired concentration of nitric acid and have been applied on a huge scale because of the importance of the material as an industrial chemical and because of the necessity of concentrating the relatively dilute aqueous acid as manufactured to the high strength material desired for use. The strategic position of nitric acid is such that improved processes giving increased yields are particularly desirable.

An object of the present invention is a novel method for the concentration of nitric acid characterized by increased efficiency. A further object is a method for the production of concentrated nitric acid in which a greater capacity is obtained per unit of apparatus. A still further object is an improved apparatus assembly for the production of concentrated nitric acid. Additional objects will be disclosed as the invention is described more in length in the following.

We have found that the foregoing objects are attained when we carry out the concentration of aqueous solutions of nitric acid by the method of our invention, which comprises first forming a mixture of nitric acid with sulfuric acid or other suitable dehydrating agent, and bringing about the boiling of said mixture, whereby strong nitric acid vapors are driven off and condensed. The resulting acid containing both sulfuric and nitric acids, but freed from a portion of its content of the latter, is caused to pass through a heated fractionating zone, wherein the remaining nitric acid content is expelled in the form of strong nitric acid vapors. A residual acid is left comprising substantially an aqueous solution of sulfuric acid having a negligible content of nitric acid.

In order to describe the invention more clearly, reference is made to the accompanying drawing, which is a schematic representation of one embodiment of apparatus elements in which the various steps of the process may be carried out. It will be understood that the drawing is shown by way of illustration only and that it should not be taken in any way as limiting the method of operation or the forms of apparatus used.

Figure 1 is a schematic cross-section of the apparatus of the invention.

The preheater 1 is connected through valve 2 with the preliminary boiler 3. This in turn is joined to the entrainment vessel 4 which connects with dehydrating tower 5. At the base of this tower are the boiling tubes 6 which empty into the denitrating tower 7.

In carrying out the acid concentration process according to the invention, a mixture of sulfuric and nitric acids, for example containing 55% $H_2SO_4$, 24% $HNO_3$, and 21% $H_2O$, is introduced into the system and caused to pass through the jacketed preheater 1, in which it may be brought to the boiling point or at any rate is raised in temperature. The acid is fed from the preheater through valve 2 to preliminary boiler 3 in which it is boiled to drive off vapors of concentrated nitric acid, at least 95% $HNO_3$ in strength. The preliminary boiling tubes 3 are only partly filled with liquid so that the vapors are forced through entrainment vessel 4 and out line 8 to the conventional condenser and bleacher system indicated but not shown.

The remaining liquid flows by gravity through the entrainer 4 and along with acid entrained therein passes into the top of the conventional dehydrating tower 5 which is constructed of acid-proof material and is packed with some suitable acid resistant packing.

The residual acid leaving the base of the dehydrating tower passes into the boiling vessels 6, and is boiled further and then into the denitrating tower or fractionating tower 7 down through which it flows slowly countercurrent to an upward flow of steam introduced at the base of said tower; thus the acid gives off the greater part of its nitric content which is evolved in the form of concentrated vapors which pass up through the boiling tubes 6, the dehydrating tower 5, entrainer 4 and out through conduit 8 to the condenser and bleacher. The residual acid flows out of the denitrating tower at its base, and consists chiefly of aqueous sulfuric acid substantially free from nitric acid.

While the foregoing constitutes a preferred embodiment the invention is not limited thereto.

The process according to our invention is substantially a two-step process. The first step involves the distillation of strong nitric acid vapors from a mixture of sulfuric and nitric acids. In the second step, the residual acid from the first-stage distillation or topping process is caused to pass down dehydrating and fractionating columns in which the remaining nitric acid is driven off in the form of strong nitric acid vapors. In the embodiment shown in the drawing, the first stage or topping step was described as taking place in heated boiling tubes, the boiling acid flowing down over their heated surfaces in the form of thin layers. Various other types of boiling vessels are equally applicable, however, for example, vertical tubes, non-tubular vessels, etc. Likewise, the preheater 1, shown in the drawing, is not essential and the feed acid may be introduced directly into the preliminary boiling vessel or vessels.

It will be seen, therefore, that strong nitric acid vapors are obtained from two sources; (1) from the preliminary boiling vessels, and (2) from the other equipment. The vapors from these two sources will desirably go to the same collecting and condensing apparatus, as shown in the drawing, but this is not an essential of the invention. Our two-stage method of obtained the nitric acid content in the form of very concentrated vapors possesses distinct advantage over the prior art method of concentrating nitric acid by means of a dehydrating tower alone (without the preliminary boiler), followed, if desired, by subsequent boiling tubes, in that it permits a considerably increased output from a given plant, since, for a given area of heat transfer surface, more heat can be applied. In one plant, for example, designed to have the original concentrating mix flow down through a dehydrating tower and thence into boiling tubes for denitration of the residual acid, it has been demonstrated that one square foot of heating surface ahead of the dehydrating tower is at least equivalent in work performed to two square feet of heating surface beyond the dehydrating tower. Prior to the present invention, it has been the opinion of acid experts that the temperature of the acid entering the dehydrating tower must be below the boiling point. We have found that the concentrating mix not only may be at its boiling point but that it may have boiled sufficiently long to have removed considerable of its nitric acid content as concentrated vapors. While the superiority of our method has thus been demonstrated over methods employing a dehydrating tower in the first step, it is even more advantageous over methods employing still concentration alone, since it allows the recovery in concentrated form not only of the first portion of nitric acid but of the complete nitric acid content.

In carrying out our process, we preferably start with acids of the type designated as concentrating mixtures, which are ordinarily formed by blending weak nitric acid of 50–60% strength with strong sulfuric acid, for example 93%, 104.5%, or 109% $H_2SO_4$. A suitable mixture may have the composition 55% $H_2SO_4$, 24% $HNO_3$, and 21% $H_2O$, and such an acid, after the preliminary first-stage distillation according to our invention, might have a composition of 61.5% $H_2SO_4$, 15.5% $HNO_3$, and 23% $H_2O$, at which composition it would enter the fractionating tower where it would be substantially completely stripped of its nitric content. The acids used will desirably be such that 95% $HNO_3$ vapors will be given off from the preliminary boiling vessels. The acid composition cited above will satisfy such a condition, and a wide range of compositions is suitable, preferably having a water content of less than 25%. If the sulfuric acid content is markedly lower than the example cited, this may be compensated for by a higher nitric acid content.

In the foregoing description and in the claims, we have stated that the acid resulting from the distillation or topping step flowed down through a denitrating zone. It should be understood that, by the term "denitrating zone," we intend to designate all the apparatus assembly that contributes to the stripping of the residual acid of its remaining nitric acid content. This may comprise merely a single dehydrating or fractionating column or tower or it may include this in combination with subsequent boiling vessels and further denitrating columns.

We have described our invention at length in the foregoing. It will be understood, however, that many variations may be introduced in compositions of acids used, procedure followed, and types of apparatus, without departure from the scope of the invention. In the foregoing description, nitric acid has been mixed with sulfuric acid. We may, however, employ other dehydrating agents, such as phosphoric acid, arsenic acid, and the like. We intend to be limited, therefore, only by the following patent claim.

We claim:

A process for concentrating nitric acid which comprises the steps of heating a flowing stream of a mixture of nitric and sulfuric acids to its boiling point, separating the vapors of strong nitric acid from the liquid, condensing the vapors without further enrichment, passing the liquid nitric and sulphuric acid mixture to the top of a vertical vapor-liquid counter current contact zone, removing liquid from the bottom of the zone, supplying sufficient heat to the bottom of the zone to vaporize the nitric acid and force the vapors of nitric acid up through said zone, intimately contacting the nitric acid vapors moving upwardly through the zone with the liquid flowing downwardly through said zone by dispersion of the respective vapor and liquid streams, thereby enriching the vapors, removing the strong nitric acid vapors from the top of said contacting zone and condensing said vapors.

FRANCIS STAPLETON CHAMBERS, Jr.
ROBERT NIFONG GARTSIDE.